(12) United States Patent
Lee

(10) Patent No.: US 6,345,913 B1
(45) Date of Patent: Feb. 12, 2002

(54) KINETIC PRESSURE FLUID BEARING APPARATUS

(75) Inventor: Chang-woo Lee, Kyonggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 242 days.

(21) Appl. No.: 08/960,433

(22) Filed: Oct. 29, 1997

(30) Foreign Application Priority Data

Oct. 29, 1996 (KR) .......................................... 96-49785

(51) Int. Cl.[7] .............................................. F16C 21/00
(52) U.S. Cl. ...................................... 384/101; 384/123
(58) Field of Search ................................ 384/102, 101, 384/112, 123, 610

(56) References Cited

U.S. PATENT DOCUMENTS 1,469,424 A * 10/1923 McQuaid et al. ........... 384/610
5,277,499 A * 1/1994 Kameyama ................. 384/123

* cited by examiner

*Primary Examiner*—Lenard A. Footland
(74) *Attorney, Agent, or Firm*—Sughrue Mion, PLLC

(57) ABSTRACT

A kinetic pressure fluid bearing apparatus is disclosed, which includes a clearance supporting portion formed between a lower end portion of a rotary shaft and a first kinetic pressure generating groove on a surface of a thrust bearing. The clearance supporting portion includes a ball inserting groove formed on any one of the lower end portion of the rotary shaft and the surface of the thrust bearing, and a ball inserted into the ball inserting groove. By such a kinetic pressure fluid bearing apparatus, it is possible to prevent oscillation of the rotary shaft, which occurs when the rotary shaft starts to rotate and stops its rotation. It is also possible to prevent abrasion of the rotary shaft and the thrust bearing due to their friction as well as overload of the rotary shaft by friction. As a result, performance of the product can be improved.

4 Claims, 3 Drawing Sheets

KINETIC PRESSURE FLUID BEARING APPARATUS

BACKGROUND OF THE INVENTION

1. Field of the Invention

The present invention relates to a kinetic pressure fluid bearing apparatus, and more particularly, to a kinetic pressure fluid bearing apparatus in which a clearance supporting portion is formed between a rotary shaft and a thrust bearing which faces the rotary shaft.

2. Description of the Related Art

Recently, with improvements in the fields of information and computer technology, there has arisen a need for rotary shafts with higher rotational speed and high accuracy, but with no unwanted movement or oscillation. Such rotary shafts are needed in driving motors for various machines, such as a polygon mirror driving gear of a laser printer, a spindle motor of a hard disk, a head driving motor of a VCR, and the like. Movement or oscillation of the rotary shaft will degrade the performance of the machine. A driving motor capable of stably rotating at high speed has been developed together with a fluid bearing apparatus which enables the rotary shaft of the driving motor to rotate at high speed with high accuracy.

A conventional fluid bearing apparatus which is applied to the machines requiring high accuracy and high speed will be described with reference to FIG. 1, which shows a sectional view illustrating a fluid bearing apparatus and a distribution curve of pressure occurring in a rotary shaft by a thrust bearing.

Referring to FIG. 1, a thrust bearing 50 is positioned in one end of a substrate 10 and mounted to the substrate 10 and to a sleeve 20. A rotary shaft 30 is inserted into a through hole 25 of the sleeve 20 to face a surface of the thrust bearing 50. The rotary shaft 30 supports its vertical thrust load. A first kinetic pressure generating groove 50a is formed on the surface of the thrust bearing 50. An air vent 20a is formed in the sleeve 20 to implant a fluid into a portion where the thrust bearing 50 and the rotary shaft 30 face each other. A herring bone shaped second kinetic pressure generating groove 30a is formed on either an external side of a part of the rotary shaft 30 which is inside the opening 25 of the sleeve 20 or an internal side of the sleeve 20 within the opening 25.

The operation of the fluid bearing apparatus as aforementioned will be described below.

When the power is applied to the apparatus, the rotary shaft 30 starts to rotate. The rotational speed of the rotary shaft 30 increases to a predetermined value. A vortex flow having the same direction as the rotational direction of the rotary shaft 30 is then formed at a lower end portion of the rotary shaft 30. The vortex flow flows into edge portions A and C of the first kinetic pressure generating groove 50a. Then, the vortex flow rotates and flows into a center portion B of the first kinetic pressure generating groove 50a. The area of the first kinetic pressure generating groove 50a is gradually reduced as one goes from the edge portions A and C towards the center portion B. A low fluid pressure occurs at the edge portions A and C of the first kinetic pressure generating groove 50a. A minimum fluid pressure, which boosts the rotary shaft 30, occurs at the center portion B. At this time, to boost the rotary shaft 30 from the first kinetic pressure generating groove 50a, the fluid pressure has to be higher than tare and load of the rotary shaft 30 which drops the rotary shaft 30.

When the fluid pressure relative to the rotational speed of the rotary shaft 30 becomes higher than the tare and load of the rotary shaft 30, the rotary shaft 30 is boosted from the first kinetic pressure generating groove 50a to rotate without contacting with the first kinetic pressure generating groove 50a.

The occurrence of such a fluid pressure in the first kinetic pressure generating groove is determined by the rotational speed of the rotary shaft, the area of the first kinetic pressure generating groove, and the clearance between the rotary shaft and the first kinetic pressure generating groove. Since the area of the first kinetic pressure generating groove and the clearance are determined in advance by the tare and load of the rotary shaft, the fluid pressure finally depends on the rotational speed of the rotary shaft.

In the conventional fluid bearing apparatus, the rotary shaft 30 reaches a predetermined number of revolutions per minute (rpm) in a predetermined time after the rotary shaft started to rotate. In this case, the fluid bearing apparatus has several problems.

In the case that the fluid pressure in the first kinetic pressure generating groove is lower than the tare and load of the rotary shaft, the rotary shaft rotates in contact with the first kinetic pressure generating groove. This results in abrasion and overload of the rotary shaft and the first kinetic pressure generating groove due to friction.

In addition, when the fluid pressure becomes similar to the tare and load of the rotary shaft as the rotational speed increases, the rotary shaft repeats to boost from the first kinetic pressure generating groove under the circumstances that it is contacted with the first kinetic pressure generating groove. This results in movement and oscillation of the rotary shaft.

Such problems occur also in the case that the rotary shaft slows to a stop.

SUMMARY OF THE INVENTION

Accordingly, the present invention is directed to a kinetic pressure fluid bearing apparatus that substantially obviates one or more of the problems due to limitations and disadvantages of the related art.

An object of the present invention is to provide a kinetic pressure fluid bearing apparatus capable of preventing abrasion and overload of a rotary shaft and a first kinetic pressure generating groove, which would otherwise occur when the rotary shaft starts and stops rotating.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a kinetic pressure fluid bearing apparatus according to the present invention includes a sleeve mounted onto a bearing bracket, a rotary shaft inserted into a through hole of the sleeve, having a second kinetic pressure generating groove on an external side which faces an internal side of the through hole, a thrust bearing mounted into one end of the through hole of the sleeve, having a first kinetic pressure generating groove on its surface which faces a lower end portion of the rotary shaft, and a clearance supporting portion formed between the first kinetic pressure generating groove on the surface of the thrust bearing and the lower end portion of the rotary shaft.

In one embodiment of the present invention, the clearance supporting portion includes a ball inserting groove formed on the lower end portion of the rotary shaft and a ball inserted into the ball inserting groove.

In another embodiment of the present invention, the clearance supporting portion includes a ball inserting groove formed on the surface of the thrust bearing and a ball inserted into the ball inserting groove.

In other embodiment of the present invention, the clearance supporting portion includes a first ball inserting groove formed on the surface of the thrust bearing, a second ball inserting groove formed on the lower end portion of the rotary shaft to face the first ball inserting groove, and balls respectively inserted into the first and second ball inserting grooves.

In the preferred embodiment of the present invention, the ball inserting groove has a v-shaped section and is formed in the center of a surface in which the ball inserting groove is formed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
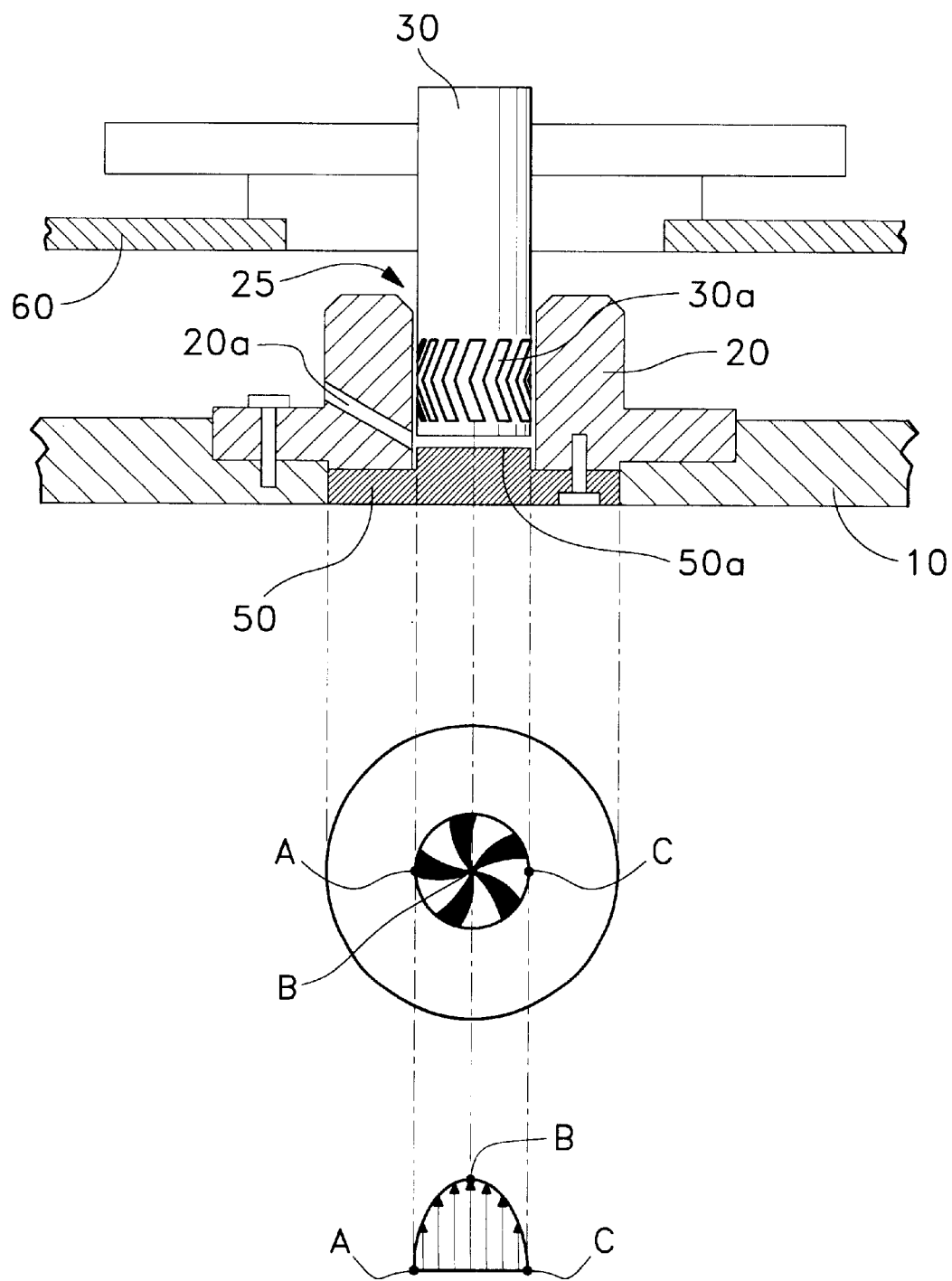
FIG. 1 shows a sectional view illustrating a conventional fluid bearing apparatus and a distribution curve of pressure occurring in a rotary shaft by a thrust bearing.
Figure 2:
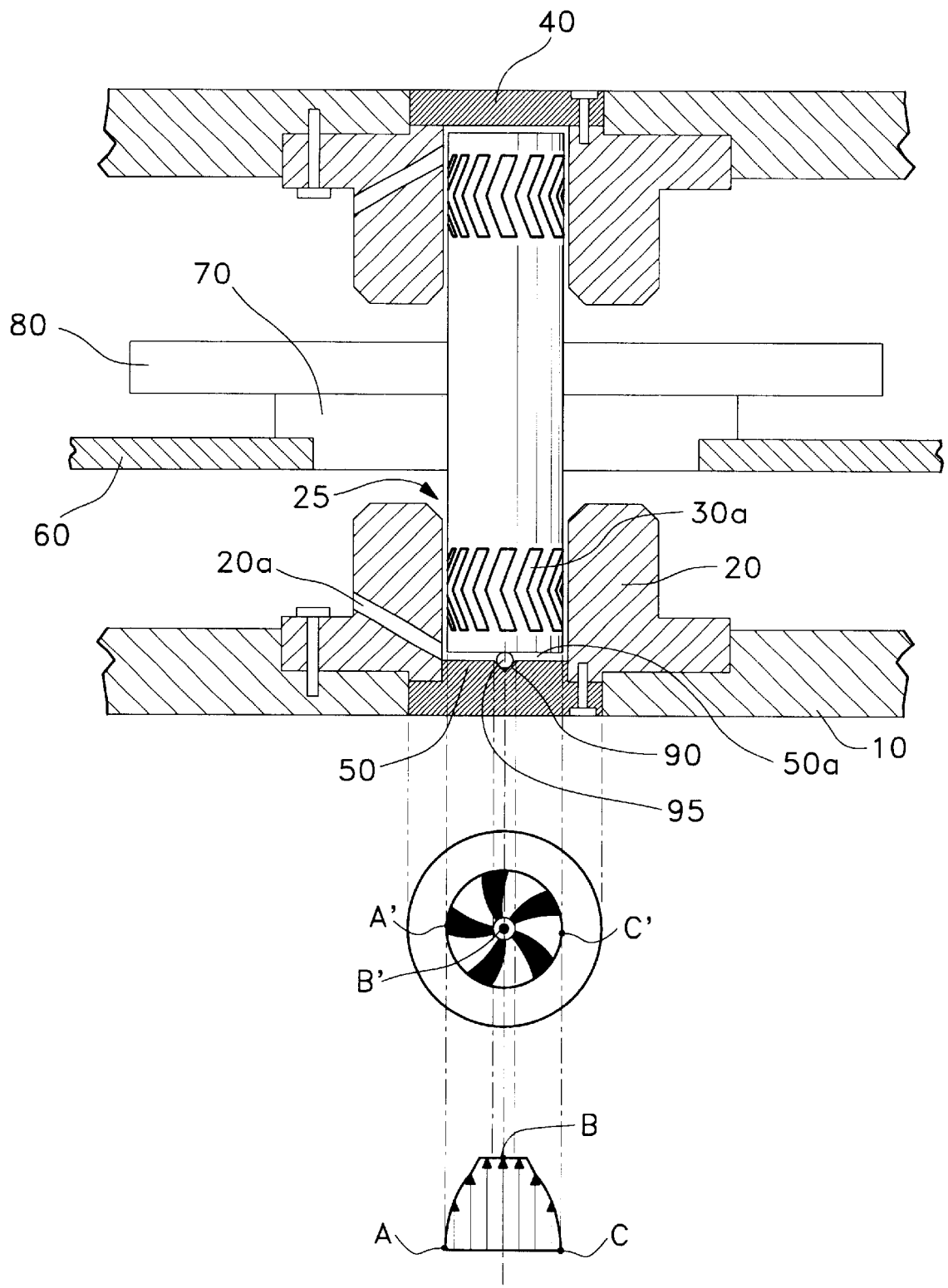
FIG. 2 shows a sectional view illustrating a fluid bearing apparatus according to the present invention, which is applied to a polygon mirror of a laser printer, and a distribution curve of pressure occurring in a rotary shaft by a thrust bearing.

FIG. 2 shows a sectional view illustrating a fluid bearing apparatus according to the present invention, which is applied to a polygon mirror of a laser printer, and a distribution curve of pressure occurring in a rotary shaft by a thrust bearing. A sleeve 20 is mounted onto a bearing bracket 10 in a recess therein. In the sleeve 20, a through hole 25 is formed with a predetermined diameter. A concentric, but larger opening is provided in the bearing bracket 10, and a thrust bearing 30 fills the opening in the bracket 10 and extends into the through hole 25 of a sleeve 20. A first kinetic pressure generating groove 50a is formed on the upper surface of the thrust bearing 50. The first kinetic pressure generating groove 50a has a spiral shape, the area of which is gradually reduced as one moves from edge portions A' and C' on the surface of the thrust bearing 50 to a center portion B' thereof. In addition, the first kinetic pressure generating groove 50a is closely formed at a predetermined depth of several μm by an etching process and a chemical vapor deposition (CVD) process. An air vent 20a is formed in a side of the sleeve 20 to a portion where the thrust bearing 50 and a rotary shaft 30 face each other.

The rotary shaft 30 is rotatably inserted into the through hole 25 of the sleeve 20. The lower end portion of the rotary shaft 30 faces the thrust bearing 50, which supports the vertical thrust load of the rotary shaft 30. A herring bone shaped second kinetic pressure generating groove 30a is formed on either an external side of the rotary shaft 30 within the through hole 25 or an internal side of the sleeve 20 within the through hole 25. The second kinetic pressure generating groove 30a has an angle of about 30° and a predetermined depth of several μm.

A hub 70 is fixably pressed onto an intermediate portion of the rotary shaft 30. A plate 60 (partially shown) is fixed to the hub 70. A rotor (not shown) is mounted into the plate 60. On the hub 70, a polygon mirror 80 is fixed. A reference numeral 40 denotes an upper thrust prop.

In the embodiment of the present invention, a ball inserting groove 95, having a predetermined depth, is formed at the center portion of the thrust bearing 50 which faces the lower end portion of the rotary shaft 30. A ball 90 is inserted into the ball inserting groove 95.

Figure 3:
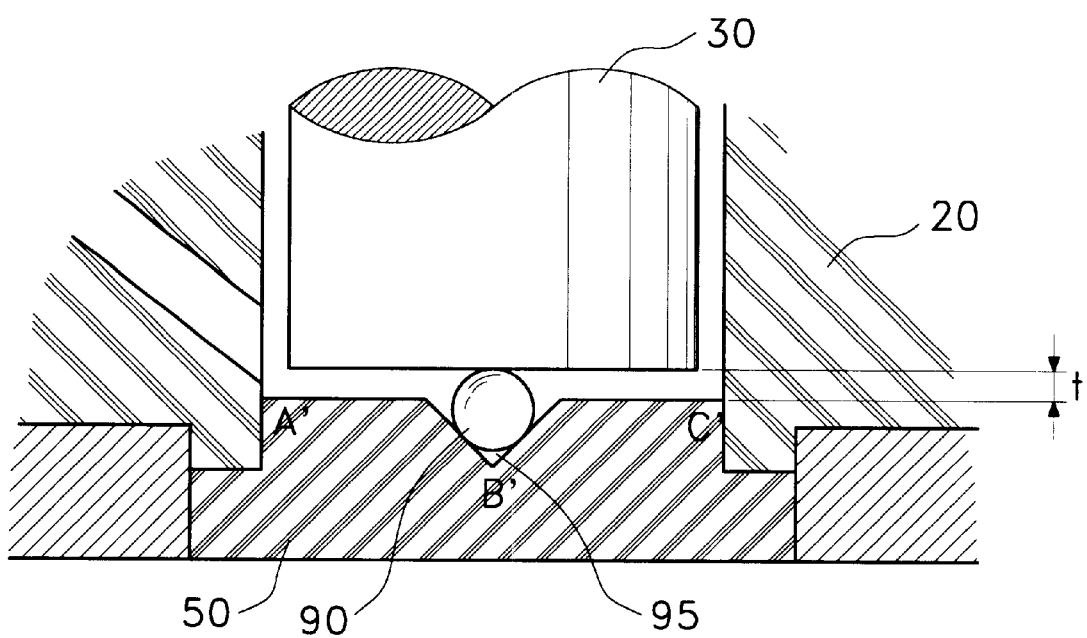
FIG. 3 is a partial enlarged view of FIG. 2.

As illustrated in FIG. 3, the ball inserting groove 95 is formed at the center portion B' of the thrust bearing 50. Desirably, the ball inserting groove 95 has a v-shaped section. In this embodiment, the ball 90 having a predetermined diameter contacts the lower end portion of the rotary shaft 30 by spot contact and contacts the sidewall of the v-shaped inserting groove 95 by line contact.

When the rotary shaft is not rotating, a clearance t is formed between the lower end portion of the rotary shaft 30 and the surface of the thrust bearing 50 due to the diameter of the ball 90. It is desirable that the clearance t is maintained at several μm. The clearance t is determined by the size of the ball 90 and the ball inserting groove 95. In this embodiment, the size of the ball inserting groove 95 is determined by the depth of the inserting groove and the angle of the v-shaped groove.

The operation of the aforementioned fluid bearing apparatus according to the present invention, which is applied to a scanning motor for driving a polygon mirror of a laser printer, will be described in detail.

If the power is applied, the rotary shaft 30 starts to rotate. As the rotational speed of the rotary shaft 30 increases to a predetermined value, a vortex flow having the same direction as the rotation direction of the rotary shaft 30 is formed at the lower end portion of the rotary shaft 30. The vortex flow flows into edge portions A' and C' of the first kinetic pressure generating groove 50a. Then, the vortex flow rotates and flows into the center portion B' of the first kinetic pressure generating groove 50a. Since the area of the first kinetic pressure generating groove 50a gradually decreases from the edge portions A' and C' to the center portion B', a low fluid pressure occurs at the edge portions A' and C' and a higher, minimum fluid pressure, which boosts the rotary shaft 30, occurs at the center portion B'.

Until the rotary shaft 30 is boosted from the first kinetic pressure generating groove 50a by the fluid pressure, the lower end portion of the rotary shaft 30 rotates in contact with the ball 90 by spot contact. Thus, the frictional resistance between the rotary shaft 30 and the first kinetic pressure generating groove 50a on the surface of the thrust bearing 50 becomes far smaller. Also, as the fluid pressure becomes greater as the shaft reaches a predetermined rpm the rotary shaft 30 is boosted from the ball 90 to rotate without any contact. As a result, the frictional resistance between the rotary shaft 30 and the first kinetic pressure generating groove 50a barely occurs.

If the rotational speed of the rotary shaft 30 is reduced to have a fluid pressure lower than the tare and load of the rotary shaft 30, the rotary shaft 30 gradually drops and comes in contact with the ball 90. Thus, the lower end portion of the rotary shaft 30 is only contacted by the ball 90 even if the fluid pressure becomes lower as the rotational speed of the rotary shaft 30 is reduced. This allows the frictional resistance between the rotary shaft and the first kinetic pressure generating groove to be minimized.

As aforementioned, the kinetic pressure fluid bearing apparatus according to the present invention has the following advantages.

It is possible to prevent oscillation of the rotary shaft, which occurs when the rotary shaft starts to rotate and stops its rotation. It is also possible to prevent abrasion of the rotary shaft and the thrust bearing due to their friction as well as overload of the rotary shaft by friction. As a result, performance of the product can be improved.

It will be apparent to those skilled in the art that various modifications and variations can be made in the kinetic pressure fluid bearing apparatus according to the present invention without departing from the spirit or scope of the invention. For example, a rectangular or hemispheric shaped ball inserting groove may be formed. The ball inserting groove may be formed on the lower end portion of the rotary shaft instead of on the thrust bearing or may be formed on both the lower end portion of the rotary shaft and the thrust bearing. In addition, the ball inserting groove may be formed in an other portion instead of the thrust bearing or the center portion thereof. Thus, it is intended that the present invention cover the modifications and variations of the invention provided they come within the scope of the appended claims and their equivalents.

What is claimed is:

1. A kinetic pressure fluid bearing apparatus having a rotary shaft positioned to rotate within a through hole of a sleeve that is mounted on a bearing bracket and a thrust bearing having a surface facing an end of said shaft, said thrust bearing having a first kinetic pressure generating groove on a surface thereof which faces said end of said shaft; the improvement comprising a clearance supporting element formed between said kinetic pressure generating groove and said end of said shaft to maintain a minimum clearance between said kinetic pressure generating groove and said end of said shaft even when said shaft is not rotating, so that said thrust bearing and said shaft are prevented from directly contacting, wherein said clearance supporting element comprises a clearance supporting means for supporting said end of said shaft away from said first kinetic pressure generating groove even in the absence of rotation of said shaft, wherein said clearance supporting means provides a clearance of several $\mu$m between said end of said shaft and said thrust bearing surface when said shaft is not rotating, wherein said clearance supporting means comprises a first ball inserting groove formed on one of the surface of said thrust bearing and said end of said shaft, and a ball inserted into said first ball inserting groove.

2. A kinetic pressure fluid bearing apparatus of claim 1, wherein a second kinetic pressure generating groove is on one of said shaft circumference facing said sleeve within said through hole and said sleeve inner circumference facing said shaft in said through hole.

3. The kinetic pressure fluid bearing apparatus as claimed in claim 1, wherein said ball inserting groove has a v-shaped section.

4. The kinetic pressure fluid bearing apparatus as claimed in claim 1, wherein said clearance supporting means further includes a second ball inserting groove formed in the the other one of the surface of said thrust bearing and said end of said shaft, to face the first ball inserting groove, and wherein said ball is inserted between the first and second ball inserting grooves.

* * * * *